United States Patent
Meulendijks et al.

(10) Patent No.: US 12,426,605 B2
(45) Date of Patent: Sep. 30, 2025

(54) SYSTEM FOR MOULDING COMPRISING A MOULD MEMBER, A METHOD FOR MOULDING AND A METHOD FOR CONFIGURING A MOULD MEMBER

(71) Applicant: MAREL FURTHER PROCESSING B.V., Boxmeer (NL)

(72) Inventors: Johannes Martinus Meulendijks, Boxmeer (NL); Bernardus Wilhelmus Franciscus Leferink, Boxmeer (NL); Mathias Marcellus Kuijpers, Boxmeer (NL); Caz Boudri, Boxmeer (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 498 days.

(21) Appl. No.: 17/912,258

(22) PCT Filed: Feb. 17, 2021

(86) PCT No.: PCT/EP2021/053885
§ 371 (c)(1),
(2) Date: Sep. 16, 2022

(87) PCT Pub. No.: WO2021/190825
PCT Pub. Date: Sep. 30, 2021

(65) Prior Publication Data
US 2023/0142861 A1    May 11, 2023

(30) Foreign Application Priority Data
Mar. 26, 2020   (NL) .................................. 2025218

(51) Int. Cl.
*A22C 7/00*   (2006.01)
*B29C 33/46*  (2006.01)
*B29C 43/50*  (2006.01)

(52) U.S. Cl.
CPC .......... *A22C 7/0038* (2013.01); *A22C 7/0069* (2013.01); *B29C 33/46* (2013.01); *B29C 2043/5053* (2013.01)

(58) Field of Classification Search
CPC ... A22C 7/0038; A22C 7/0069; A22C 7/0076; A22C 7/0084; A22C 7/0092;
(Continued)

(56) References Cited

U.S. PATENT DOCUMENTS 3,262,218 A * 7/1966 Cymbalisty ............. B01F 29/61
                                              210/395
3,504,639 A * 4/1970 Lilien ..................... B30B 11/12
                                              425/437
(Continued)

FOREIGN PATENT DOCUMENTS

BR  112013006548 B1 * 6/2018  ........... A22C 7/0076
CN       1949981 A      4/2007
(Continued)

OTHER PUBLICATIONS

Lehner, Why Do We Rely So Much on Geometry in Our Designs_ Human Spaces, 2018, p. 1. (Year: 2018).*
(Continued)

*Primary Examiner* — Drew E Becker
*Assistant Examiner* — Luis Eugenio Diou Berdecia
(74) *Attorney, Agent, or Firm* — Workman Nydegger

(57) ABSTRACT

A system and a method for moulding food products from a pumpable foodstuff mass include a mould member having an outer surface. One or more recessed mould cavities are provided. An ejection fluid inlet opening of the mould member is arranged relatively movable with respect to an outlet opening of the ejection fluid source. Ejection fluid is allowed to enter the mould member when an outlet opening overlaps an ejection fluid inlet opening.

13 Claims, 13 Drawing Sheets

(58) Field of Classification Search
CPC ..... A22C 7/003; A22C 17/0006; A22C 11/08; A23P 30/10; B29C 39/44; B29C 39/26; B29C 39/36; B29C 39/24; B29C 39/00; B29C 39/04; B29C 37/0003; B29C 41/26; B29C 41/265; B29C 43/34; B29C 43/08; B29C 43/085; B29C 33/0061; B29C 31/04; B29C 2043/5053; B29C 33/46; A21C 11/00; A21C 11/08; A23K 40/20; A23N 17/005; B30B 11/12; B30B 9/241; B30B 9/246

See application file for complete search history.

(56) References Cited

U.S. PATENT DOCUMENTS

| | | | |
|---|---|---|---|
| 3,991,440 A * | 11/1976 | Hendrickson, Jr. | A22C 7/0069 425/294 |
| 4,212,609 A * | 7/1980 | Fay | A21C 9/04 425/231 |
| 4,348,166 A * | 9/1982 | Fowler | A23L 7/13 83/99 |
| 6,764,293 B2 * | 7/2004 | Kashulines, Jr. | A23G 1/205 425/363 |
| 7,819,650 B2 | 10/2010 | Meskendahl et al. | |
| 7,931,461 B2 | 4/2011 | Van Der Eerden et al. | |
| 8,747,934 B2 | 6/2014 | Meskendahl et al. | |
| 9,060,544 B2 | 6/2015 | Meskendahl et al. | |
| 9,986,755 B2 | 6/2018 | Meskendahl et al. | |
| 10,537,114 B2 | 1/2020 | Van Gerwen | |
| 10,631,565 B2 | 4/2020 | Meulendijks et al. | |
| 11,013,255 B2 | 5/2021 | Meskendahl et al. | |
| 11,395,499 B2 | 7/2022 | Van Gerwen | |
| 11,406,125 B2 | 8/2022 | Dunnewind et al. | |
| 11,412,745 B2 | 8/2022 | Dunnewind et al. | |
| 11,412,746 B2 | 8/2022 | Van Gerwen | |
| 2002/0012731 A1 * | 1/2002 | van Esbroeck | A22C 17/0006 426/496 |
| 2005/0220932 A1 * | 10/2005 | van der Eerden | A23P 30/10 426/1 |
| 2007/0104830 A1 * | 5/2007 | Fornaguera | A23G 1/54 426/5 |
| 2007/0224305 A1 * | 9/2007 | Meskendahl | B08B 1/34 425/436 R |
| 2009/0134308 A1 * | 5/2009 | van der Eerden | A23P 30/10 419/2 |
| 2009/0134544 A1 * | 5/2009 | Van Der Eerden | A22C 7/0038 264/109 |
| 2011/0014344 A1 | 1/2011 | Meskendahl et al. | |
| 2012/0058213 A1 * | 3/2012 | Lindee | A22C 7/0038 425/135 |
| 2012/0177786 A1 * | 7/2012 | Van Der Eerden | A22C 7/0069 426/89 |
| 2013/0087289 A1 * | 4/2013 | Ogasawara | B29C 65/70 156/349 |
| 2013/0273192 A1 * | 10/2013 | Van Gerwen | B66F 9/187 425/317 |
| 2013/0337128 A1 * | 12/2013 | Van Gerwen | A22C 7/0069 156/60 |
| 2014/0212558 A1 * | 7/2014 | Spierts | A22C 11/08 426/519 |
| 2014/0242234 A1 | 8/2014 | Meskendahl et al. | |
| 2014/0342072 A1 * | 11/2014 | Van Gerwen | A22C 7/0076 425/239 |
| 2015/0044335 A1 * | 2/2015 | Meulendijks | A22C 7/0069 426/512 |
| 2015/0208716 A1 * | 7/2015 | Schmid | A23P 30/10 425/149 |
| 2015/0282520 A1 | 10/2015 | Meskendahl et al. | |
| 2015/0351416 A1 * | 12/2015 | Bigeard | A23P 30/25 426/549 |
| 2015/0359231 A1 * | 12/2015 | Van Gerwen | A22C 7/0069 425/331 |
| 2015/0360423 A1 * | 12/2015 | Torres Martinez | B29C 70/545 425/510 |
| 2016/0031143 A1 * | 2/2016 | Kras | A23P 10/25 425/308 |
| 2016/0353755 A1 * | 12/2016 | Van Gerwen | A22C 7/0069 |
| 2016/0374357 A1 * | 12/2016 | Lok | A22C 7/0069 425/162 |
| 2017/0142987 A1 * | 5/2017 | Van Gerwen | A22C 7/0069 |
| 2018/0110375 A1 * | 4/2018 | Hansen | A22C 7/0069 |
| 2018/0255824 A1 * | 9/2018 | Meskendahl | B08B 1/34 |
| 2019/0116813 A1 * | 4/2019 | Verhoeven | B08B 9/00 |
| 2019/0183162 A1 | 6/2019 | Meulendijks et al. | |
| 2019/0275564 A1 * | 9/2019 | Van Gerwen | B08B 5/00 |
| 2019/0343165 A1 | 11/2019 | Dunnewind et al. | |
| 2020/0100511 A1 | 4/2020 | Dunnewind et al. | |
| 2020/0113194 A1 | 4/2020 | Van Gerwen | |
| 2020/0113195 A1 | 4/2020 | Van Gerwen | |
| 2021/0244068 A1 | 8/2021 | Meskendahl et al. | |
| 2022/0354136 A1 | 11/2022 | Dunnewind et al. | |

FOREIGN PATENT DOCUMENTS

| | | | |
|---|---|---|---|
| CN | 106061271 A | 10/2016 | |
| CN | 109382939 A * | 2/2019 | ............ B29C 31/04 |
| CN | 109890212 A | 6/2019 | |
| CN | 110087473 A | 8/2019 | |
| CN | 110087474 A | 8/2019 | |
| KR | 20070118204 A * | 12/2007 | ............ A23C 19/068 |
| WO | 2004002229 A2 | 1/2004 | |
| WO | 2005107481 A2 | 11/2005 | |
| WO | WO-2017155390 A1 * | 9/2017 | ............ A22C 7/003 |
| WO | WO-2018034568 A1 * | 2/2018 | ............ A22C 7/0038 |
| WO | 2018099861 A1 | 6/2018 | |
| WO | WO-2018111108 A2 * | 6/2018 | ............ A22C 7/0076 |
| WO | WO-2018117831 A1 * | 6/2018 | ............ A22C 7/0038 |
| WO | WO-2018193046 A1 * | 10/2018 | ............ A22C 7/0076 |
| WO | 2019048805 A1 | 3/2019 | |
| WO | WO-2019229038 A2 * | 12/2019 | ............ A23P 30/10 |

OTHER PUBLICATIONS

International Search Report from PCT Application No. PCT/EP2021/053885, Apr. 29, 2021.

Search Report from corresponding Netherlands Application No. 2025218, Dec. 22, 2020.

Search Report from Chinese Application No. 202180022940.9, Jan. 13, 2023.

Office Action from Chinese Application No. 202180022940.9, Jan. 18, 2023.

* cited by examiner

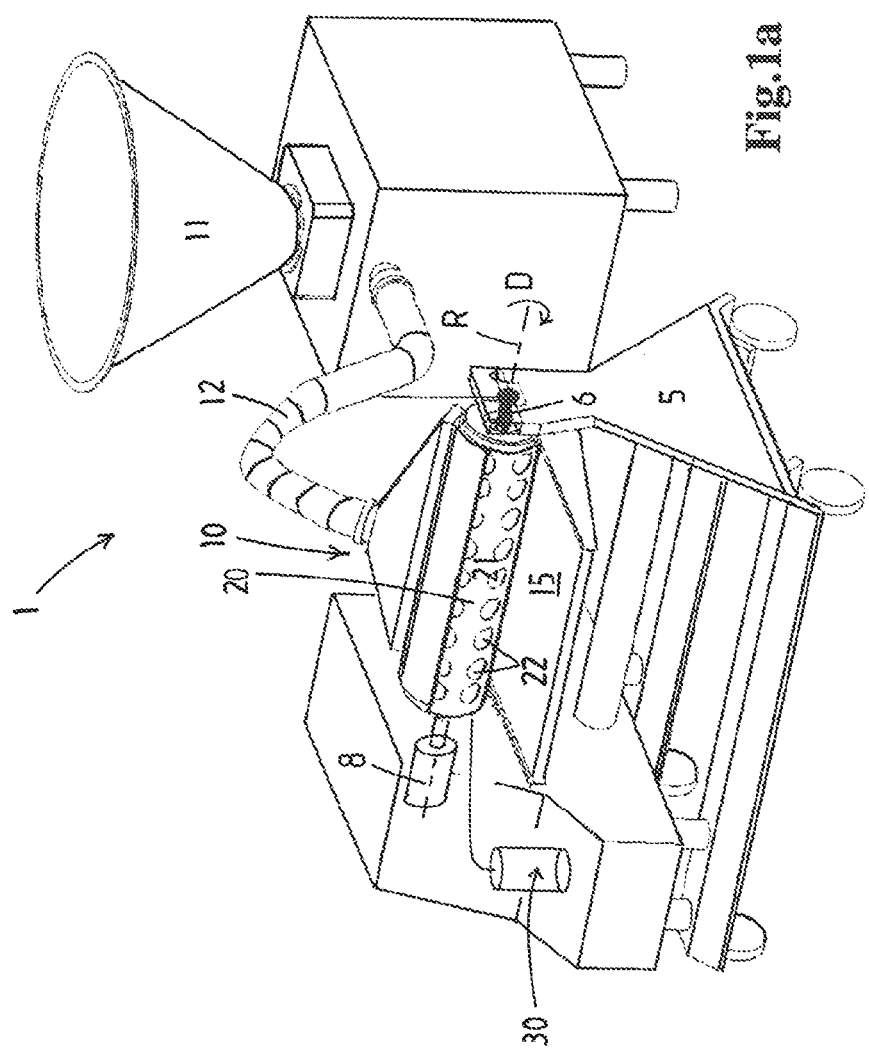

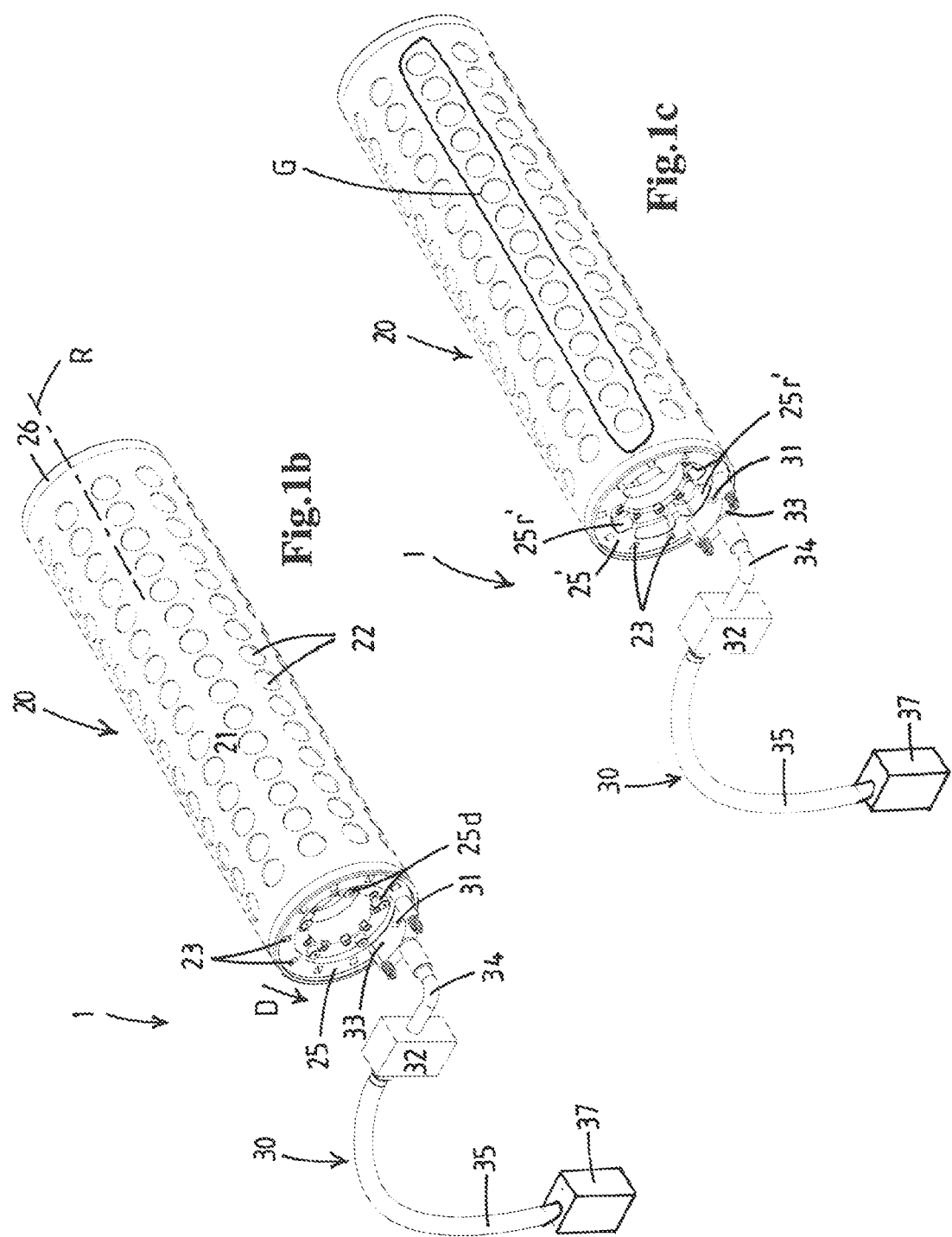

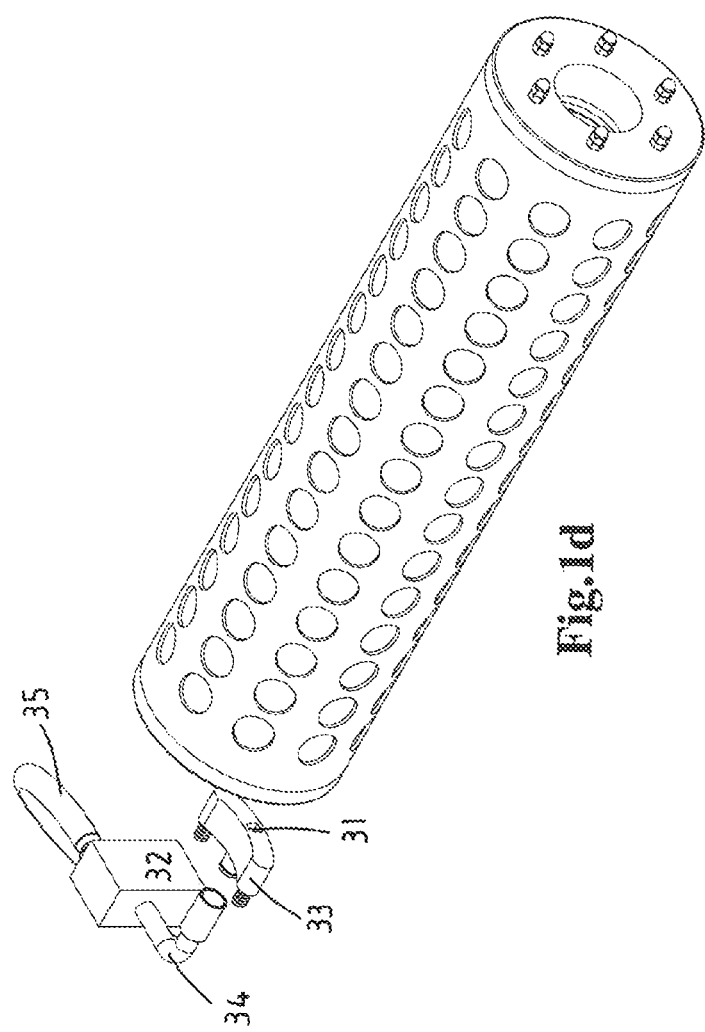

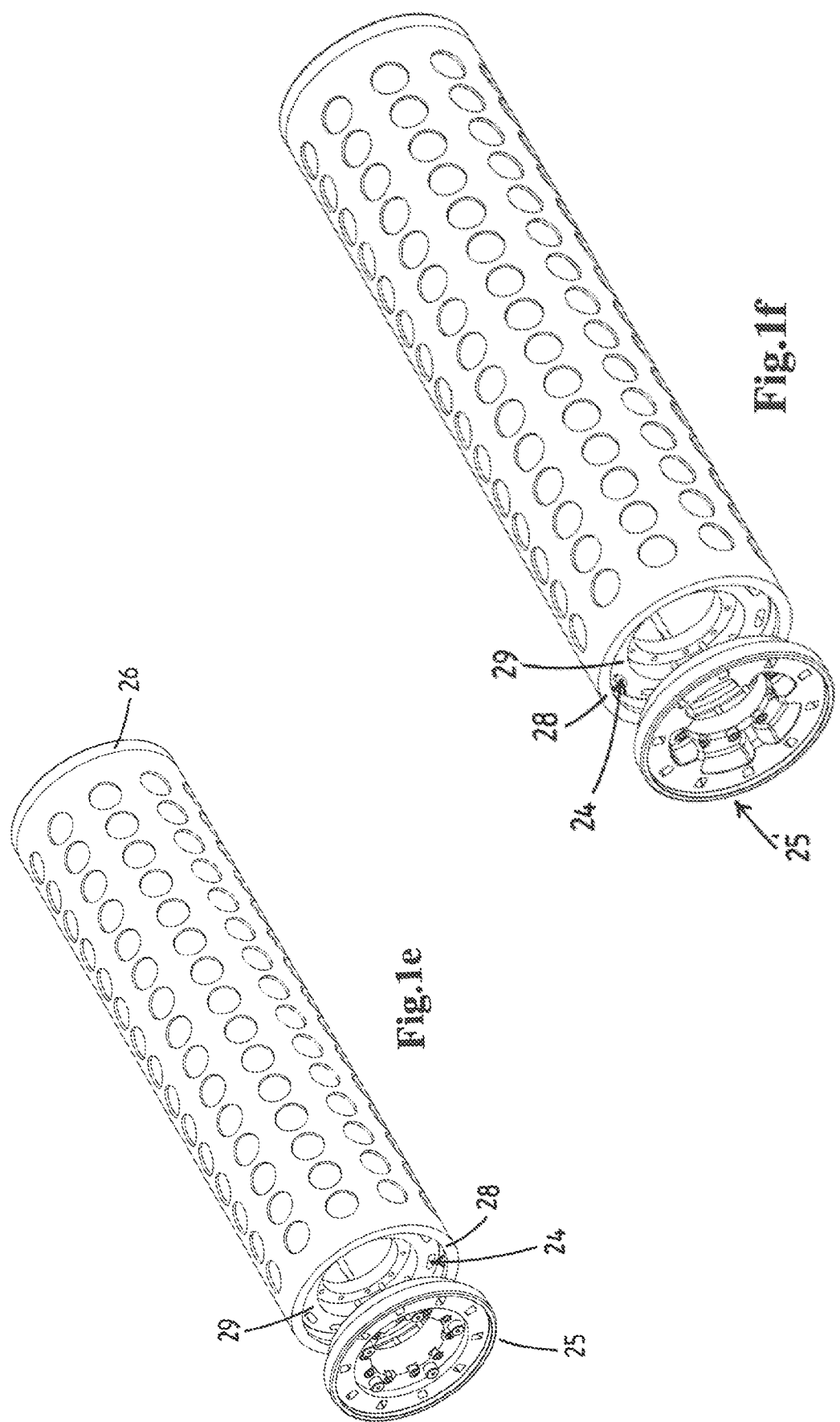

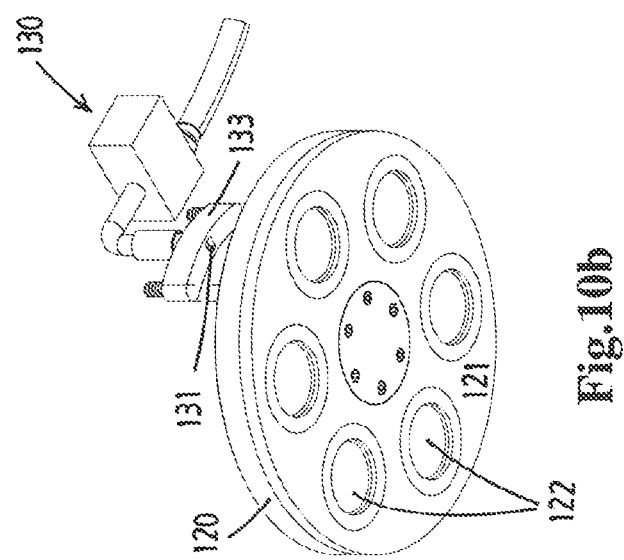
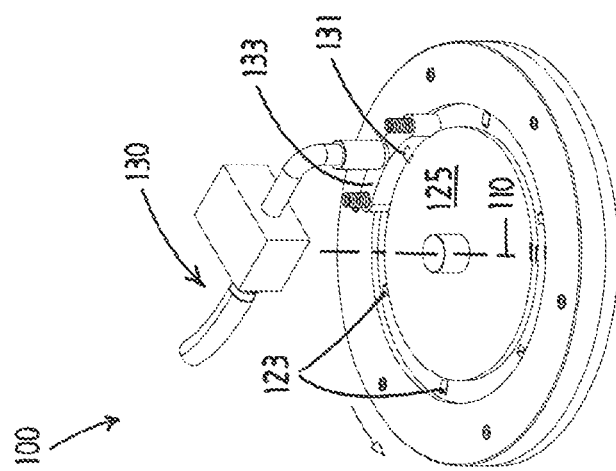

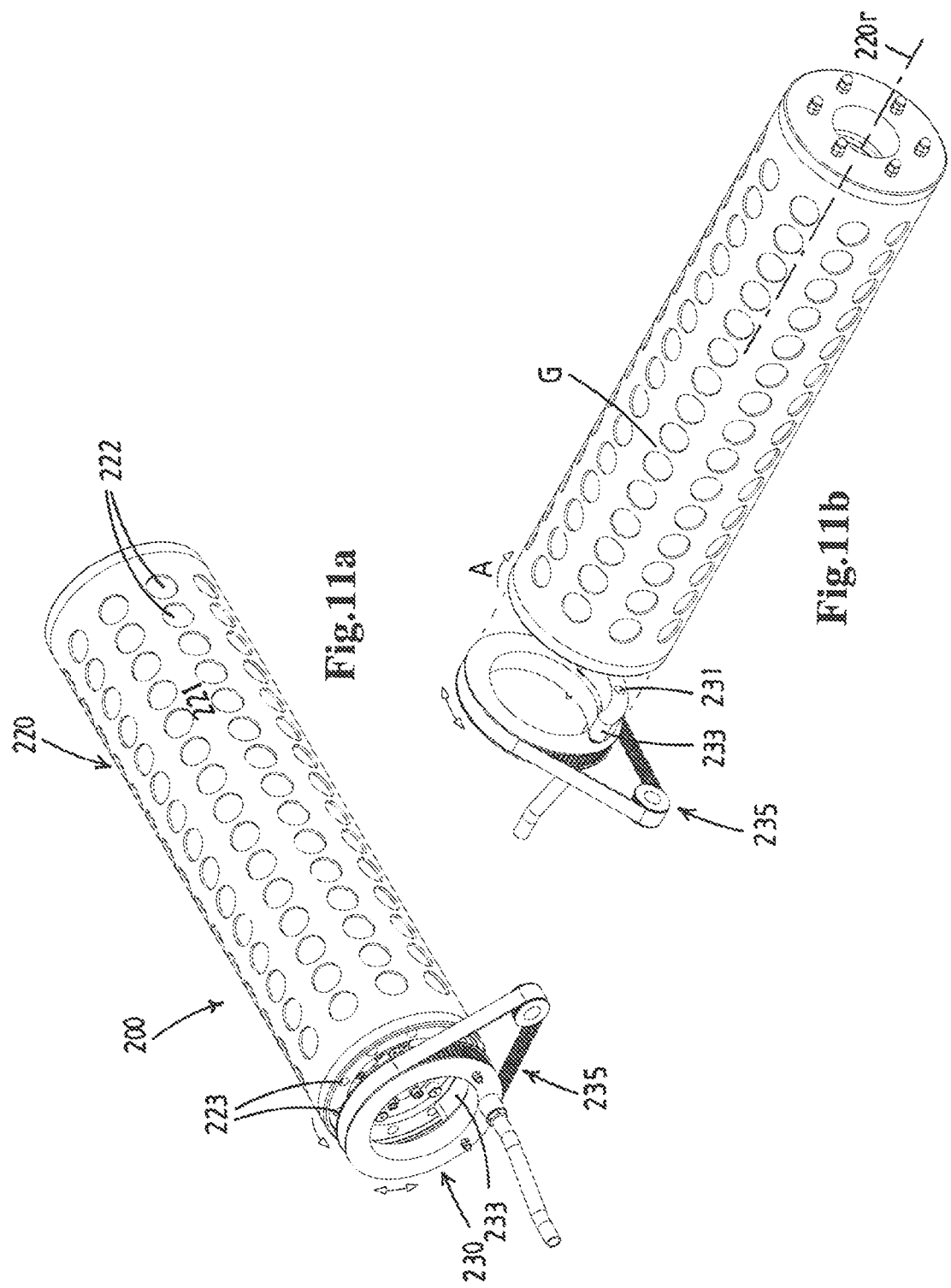

SYSTEM FOR MOULDING COMPRISING A MOULD MEMBER, A METHOD FOR MOULDING AND A METHOD FOR CONFIGURING A MOULD MEMBER

BACKGROUND

The present invention relates to a system and method for moulding comprising a mould member and a method for configuring a mould member. Systems for moulding food products from a pumpable foodstuff mass of one or more food starting materials are known in the art and have been commercially offered by Marel under the name RevoPortioner for over a decade. The system comprises a mould member, e.g. a mould drum as described in WO2005107481, or a turret as described in WO2019048805 of the same applicant.

The mould member comprises an outer surface wherein one or more recessed mould cavities are provided, and further an ejection fluid inlet opening and associated channel extending to a group of one or more mould cavities from which moulded food products are to be ejected simultaneously.

Each mould cavity defines a shape of the product which is to be moulded. In embodiments, the shape is that of a disc to mould a circular product, e.g. a meat patty. Other products, e.g. of poultry based starting material, are formed in rather small cavities, e.g. of a more or less rectangular shape. Alternatively mould members having cavities of more irregular shape are known, e.g. to mould products having an irregular circumference and/or an irregular thickness. The products may also be elongated, e.g. sausage like products, etc. The mould cavities have an opening in the outer surface for the introduction of foodstuff mass into the mould cavity, and for ejection of the moulded product.

Examples of the products to be moulded in the system of the invention are hamburgers, nuggets, schnitzels and three-dimensional products such as tenderloins, steaks, (meat) balls and fillets. An appropriately designed mould member can handle different foodstuff masses, such as red and white meat, fish, potato, and other plant-based foodstuff masses, but also edible fungi-based masses, soy-based masses and edible insect-based masses and the like. Often the mass is ground, e.g. ground meat.

In general, it is envisaged that food products with a thickness between for example 3 and 40 mm can be produced. Product length and/or width, or diameter, may for example vary between 5 and 250 mm, e.g. diameters of between 8 and 15 centimetres, e.g. for hamburger meat patties.

An ejection fluid source is provided, comprising an outlet opening. In the system the ejection fluid inlet opening of the mould member which is arranged relatively movable with respect to the outlet opening of the ejection fluid source. Ejection fluid is allowed to enter the mould member when an outlet opening overlaps an ejection fluid inlet opening. With overlap is meant the extent of common cross-sectional area between the outlet and inlet opening.

Per group of one or more mould cavities from which moulded food products are to be ejected simultaneously, ejection fluid is allowed to enter the mould member. Pressure is allowed to build up in the mould member, to allow a pulse of ejection fluid to be supplied to the mould cavities via the channel and cause ejection of the moulded products from the group of one or more mould cavities. This concept has proven to be advantageous in that mechanical contact with the moulded food products is avoided. Also, damage and/or deformation of the moulded food products is avoided.

It is common to provide both the inlet opening and the outlet opening with a circular or round shaped cross section. The size of the overlapping area between the ejection fluid inlet opening and the outlet opening is such that sufficient fluid can pass to allowing ejection of moulded food products. After the initiation of the overlap, the overlapping area increases at a certain speed. This speed corresponds to the building up of pressure in the mould member. When sufficient pressure has been built up, moulded food products are effectively ejected. With circular openings moving relative to one another, it takes a relatively long movement distance before a significant amount of overlapping cross sectional area is created. This results in a relatively slow pressure rise and a relatively slow compression speed.

A further mould drum is described in WO2018/099861, the drum having a multitude of cavities grouped in a multitude of rows, each cavity having a porous bottom- and/or sidewall. The cavities in one row are connected with an associated channel, the channel extending parallel to the center-axis of the drum from one front end where the channel has an ejection fluid inlet opening with geometry defined by semi-circular ends connected by an inner and outer radius.

It has been noted that under circumstances, the ejection of moulded food products is less efficient. For example, when comparing similar mould members with distinct groups of mould members. With the group that comprises more mould cavities from which moulded food products are to be ejected simultaneously, ejection has been found to be less efficient. In addition, when extending the length of the drum from conventional 700 mm or smaller, to 1000 mm or longer, a larger volume of the mould member had to be pressurized. Hence, without other changes, the ejection became less efficient.

SUMMARY

The aim of the invention is to provide a system, wherein the ejection process of moulded food products is improved.

This aim is achieved according to a first aspect of the invention in that the geometry of the ejection fluid inlet opening and the outlet opening of the ejection fluid source is such that at the initiation of the overlap there is a linear contact between the ejection fluid inlet opening and the outlet opening. The effect of the linear contact is that in use and at a given speed of relative movement, a size of the overlapping area between the ejection fluid inlet opening and the outlet opening from the initiation of the overlap increases faster than when both the inlet opening and the outlet opening have a circular cross section.

An advantage of this improved geometry is that with an increased growth of overlapping area the building up of pressure occurs faster, i.e. a faster compression speed, resulting in a stronger fluid pulse and more effective ejection of moulded products. As such, optimum use is made of the ejection fluid, while minimizing the use to a required extent. As ejection fluid, in particular compressed air, is expensive, optimizing the use thereof results in cost savings. The ejection fluid is used to push the moulded products out of the mould member. Losses of pressurized fluid may be prevented and/or reduced, resulting in cost savings. Another advantage is that larger groups of cavities may be ejected simultaneously, for example allowing larger mould members. Another advantage is that the improved flow of ejection fluid may prevent pollution or clogging of the permeable material with food product. Possibly, the cleaning frequency can be reduced, and the production run time of a mould member may be longer. Possibly, a more uniform pressure distribution over the group of mould cavities that is to be ejected simultaneously is achieved.

Hence, according to the first aspect of the invention the speed with which the size of the overlap increases, and thus speeds up and enlarges the compression. Other factors that also affect the ejection of food products are the maximum pressure of the ejection fluid that is reached during the overlap, which is influenced by the pressure of the ejection fluid source and the size of the overlap, and the duration of the ejection fluid flow, i.e. the time of overlap and thus the time during which a certain ejection fluid pressure is supplied to the mould cavities. Other factors generally require more ejection fluid and hence result in larger costs.

The system of the first aspect of the invention creates a significant increased amount of overlapping cross sectional area within a relatively short movement distance of the openings moving relative to one another. In other words, a rapid increase of the overlapping area between the openings is created, allowing a fast entry of ejection fluid into the mould member, already at the initiation of the overlap of the openings.

The geometry of an opening includes surface area and/or perimeter shape. Possibly, the surface area of one of the openings is increased to have a fast increase of the size of overlap. In embodiments, the total size of the overlapping area is preferably similar to when both the inlet opening and the outlet opening have a circular cross section. An increased overlapping area could result in increased losses of pressurized fluid.

The surface area of an ejection fluid inlet is e.g. between 50-150%, more preferably between 75-125% the total size of the overlapping area. Hence, the surface area of the outlet opening of the ejection fluid source may be smaller or larger than that of the ejection fluid inlet, or similar in size.

According to the first aspect of the invention, there is a linear contact between the ejection fluid inlet opening and the outlet opening at the initiation of the overlap. With linear contact is meant that the parts of the perimeter of the openings at the initiation of the overlap are aligned, in that they have a same or complementary shape. For example, both perimeters are straight, extending perpendicular to the direction of movement. Or the perimeters have respectively a concave and a complementary convex shape. Or the perimeters have a triangular portion including respectively an acute angle and a complementary obtuse angle.

In embodiments, the ejection fluid inlet opening and/or the outlet opening comprise an elongated leading portion, extending perpendicular to a direction of movement. In embodiments wherein the direction of movement is a rotation, this elongated leading portion extends radially, seen from the axis of rotation. The leading portion is 'leading' when seen in the direction of movement. When this elongated leading portion of an opening meets the other opening, this forms the initiation of the overlap. Such a perimeter shape of the openings results in a faster increase of the size of overlap.

For example, the elongated leading portion is straight, or the elongated leading portion is polygonal or curved, circumscribed by a circle having a radius significantly exceeding the diameter of the opening. Such geometries result in a fast increase of overlapping area. Possibly, the initiation of the overlap starts with a line contact between the openings. For example, the perimeter shape of the ejection fluid inlet opening and/or the outlet opening is quadrilateral, rectangular, or triangular with the base of the triangle at the leading portion thereof, or oblong, again with the elongated side at the leading portion thereof. In preferred embodiments, the ejection fluid inlet opening and/or the outlet opening has a quadrilateral perimeter having an elongated leading portion and a trailing portion of equal length.

In embodiments, the geometry of the outlet opening of the ejection fluid source and the geometry of the inlet opening of the mould member are similar.

In embodiments, the geometry of the outlet opening of the ejection fluid source and/or the inlet opening of the mould member is adjustable, in particular the size and/or the shape of the opening. The geometry of the outlet opening of the ejection fluid source is for example tuned to the geometry of the mould member, e.g. the dimensions and/or the number of mould cavities in a group from which moulded food products are to be ejected simultaneously. With more cavities, more ejection fluid may be required and hence larger openings. It is also conceivable that the geometry of the outlet opening of the ejection fluid source and/or the inlet opening of the mould member is tuned to the pumpable foodstuff mass. A relatively sticky foodstuff mass may require more ejection fluid and hence larger openings. It is also conceivable that the geometry of the outlet opening of the ejection fluid source and/or the inlet opening of the mould member is altered during operation, e.g. to compensate for clogging of a permeable volume of the mould member.

By adjusting the geometry of the outlet opening of the ejection fluid source and/or the inlet opening of the mould member, also the duration of the ejection fluid flow may be adjusted, i.e. the time of overlap and thus the time during which a certain ejection fluid pressure is supplied to the mould cavities. This also affects the efficiency of the ejection process.

In embodiments, the adjustment of the geometry of the ejection fluid inlet opening and/or the outlet opening of the ejection fluid source is controlled, e.g. automatically controlled. For example, the geometry of the outlet opening of the ejection fluid source is adjusted depending on the type of mould member, speed of relative movement of the ejection fluid source and the mould member, mould member parameters such as usage, and system parameters such as the type of pumpable foodstuff mass.

In embodiments, both known and according to inventions disclosed herein, the mould member comprises an ejection fluid inlet opening and associated channel extending to the one or more mould cavities from which moulded food products are to be ejected simultaneously.

Advantageously, a channel has a cross-sectional area exceeding the surface area of an associated ejection fluid inlet opening. As a result, the overlap between the outlet opening and an ejection fluid inlet opening acts as a 'throat' for the fluid, i.e. the narrowest cross section for the fluid supply. A large overlap is advantageous for the pressure build up in the associated channel.

In embodiments, the mould member has one or more groups, and each group has one or more mould cavities, from which the moulded products are to be ejected simultaneously. For each group, one or more ejection fluid inlet openings may be provided, allowing the entry of pressurized fluid. For each group, one or more channels may be provided, extending from the one or more ejection fluid inlet openings, to the one or more permeable volumes of the group of mould cavities from which the moulded products are to be ejected simultaneously. The one or more channels provide communication between an ejection fluid inlet opening via the channels and via the permeable volumes into the mould cavities to assist in ejection of the moulded products from the group of mould cavities. It is conceivable that for each group, only one inlet opening, and one channel is provided. Alternative combinations of one inlet opening and multiple channels, or multiple inlet openings and multiple channels, or multiple inlet openings for a single channel, are also conceivable.

In embodiments, the mould member comprises ejection fluid inlet openings at opposite sides of an associated channel extending to the one or more mould cavities from which moulded food products are to be ejected simultaneously. It is also conceivable that ejection fluid inlet openings are provided at remote locations of the mould member, e.g. at opposite sides of a mould member, each having an associate channel. For example, inlet openings are provided at both head ends of a mould drum or mould plate.

In embodiments, both known and according to inventions disclosed herein an ejection fluid source comprises an outlet opening. In the system an ejection fluid inlet opening of the mould member is arranged relatively movable with respect to the outlet opening of the ejection fluid source. An example of an ejection fluid source comprises a compressor, such as an air compressor. An outlet opening of the ejection fluid source overlaps an ejection fluid inlet opening of the mould member during the relative movement. Preferably, in embodiments the mould member is movable and an outlet opening of the ejection fluid source is stationary.

Alternatively, an ejection fluid inlet opening is stationary and an outlet opening of the ejection fluid source is moveable. It is also conceivable that both an ejection fluid inlet opening, and an outlet opening is movable with respect to each other. In embodiments of the inventions disclosed herein, the ejection fluid source is arranged relatively movable with respect to the mould member. Hence, when the ejection fluid source moves, there is a movement path of an outlet opening. When the mould member moves, there is a movement path of an ejection fluid inlet opening.

The movement could be continuously, but also intermittent movement is possible. For example, the mould member speed is constant or intermittent during operation, and the speed of an outlet opening is stationary. It is also conceivable that the speed of an outlet opening is adjustable, e.g. reciprocal. For example, an outlet opening of the fluid source is allowed a small back and forth reciprocal movement just prior to (or starting from, or just after the initiation of the overlap of the openings.

The ejection fluid source is provided with one or more outlet openings. Possibly fluid channels are provided between the ejection fluid source and the outlet openings. The ejection fluid source is arranged to allow ejection fluid to enter the mould member when an outlet opening of the ejection fluid source overlaps an ejection fluid inlet opening of the mould member. This entry of ejection fluid, and hence the build-up of pressure, starts when an outlet opening and an inlet opening overlap.

It is conceivable that a single ejection fluid source is provided, having one or multiple outlet openings arranged to allow ejection fluid to enter the mould member when an outlet opening of the ejection fluid source overlaps an ejection fluid inlet opening of the mould member. For example, a single ejection fluid source has outlet openings arranged adjacent inlet openings at the head ends of the mould member.

It is also conceivable that multiple ejection fluid sources are provided, each having an outlet opening arranged to allow ejection fluid to enter the mould member when the outlet opening of the ejection fluid source overlaps the ejection fluid inlet opening of the mould member. For example, two ejection fluid sources with associated outlet openings are arranged adjacent inlet openings at head ends of the mould member.

The ejection fluid source could e.g. comprise a compressor, provided remote from the mould member. The ejection fluid source is arranged such that the outlet opening thereof are provided along or adjacent the movement path of the inlet opening of the mould member, and/or such that the movement path of the outlet opening thereof are provided along or adjacent (a movement path of) the inlet openings of the mould member. The outlet opening of the ejection fluid source is preferably positioned adjoining the mould member, in particular adjoining a face of the mould member wherein an ejection fluid opening of the mould member is provided. For example, an ejection fluid opening of the mould member is positioned at a head end thereof, and the ejection fluid source is positioned adjacent this head end.

In embodiments, the ejection fluid source is provided with a valve, e.g. a solenoid valve. Such a valve can be used to control the ejection fluid supply. In embodiments with a valve, the channels are not constantly pressurized. The valve is controlled e.g. by a control unit based on the detected position of ejection fluid inlet opening and the outlet opening. For example, the supply of ejection fluid is disabled when there is no overlap, or insufficient overlap, between the ejection fluid inlet opening and the outlet opening. E.g. the valve allows ejection fluid supply at the moment there is sufficient overlap between the openings. After a certain time, the control unit operates the valve to shut off the supply of ejection fluid. This could prevent unnecessary waste of ejection fluid. It is also advantageous to increase the pulse of ejection fluid once the supply of ejection fluid is enabled again.

A commonly used fluid to assist in the ejection removal of a product from a mould cavity is air, in particular compressed air. Other ejection fluids, or mixtures of fluids, are also conceivable, such as water, edible oil, $CO_2$, preferably being compressed. A compressed ejection fluid is able to provide a larger pulse of ejection fluid, advantageous for the ejection of moulded products.

It is also conceivable, and known in the art, that an opening for the ejection fluid is used for cleaning of the mould member by a cleaning fluid that is flushed through the opening. This is for example done with the mould member being removed from the system, e.g. in a dedicated cleaning device for the mould member. Such a cleaning fluid may include water, chemical fluids, e.g. including bleach, disinfectants, bacteriostatic agents, etc.

In embodiments, the mould member comprises a permeable volume defining the outer surface wherein one or more recessed mould cavities are provided, and one or more channels extend to the one or more permeable volumes of the group of one or more mould cavities from which moulded food products are to be ejected simultaneously.

The permeable volume is permeable for fluid, in particular for ejection fluid, allowing the passage of ejection fluid from the channels to the mould cavities, the ejection fluid being used for assisting in the ejection of moulded products from the mould cavities. The permeability serves to allow passage or penetration of an ejection fluid through the permeable volume to cause the ejection of the product.

Fine openings of the permeable volume open out at the one or more mould cavities, such that each mould cavity of the permeable mould body is delimited at least in part by a permeable volume. It is preferred that the fine openings of the passages in the surface of the mould cavity are too small for the foodstuff mass to enter significantly into the passages during production of the food product.

The permeable volume is e.g. made of porous material, e.g. of sintered metal with a porous structure, such as stainless steel, aluminium, copper or bronze, and comprises passages with fine openings opening out at the one or more mould cavities. It is also conceivable that the permeable volume comprises one or more polymers.

Known sinter powder has a particle size of 100 pm-50μ, which has been sintered. Possible, isostatic pressing and/or coaxial compression is applied to produce a permeable volume.

The permeable volume has a porosity typically between 3-30%, advantageously between 5-15%, having fine openings with an effective pore size of 1-50 pm. The fine openings, or minute openings, are generally referred to as 'pores' in relation to a porous volume.

It is also conceivable that a permeable volume is made from a solid, non-porous or closed celled material, e.g. provided in a machining step with fine passages having fine openings that open out in the cavity, for example micropassages or nanopassages.

Possibly, the permeable volume is made using a rapid prototyping technique, e.g. metal or polymer 3D printing. Preferably fine passages of the volume are formed in the rapid prototyping process, so, as preferred, without requiring a further machining step to form these passages for the ejection fluid. For example, in a 3D printed permeable volume the average diameter, e.g. over the length thereof, of such passages is between 0.05 mm and 0.8 mm, e.g. between 0.05 and 0.3 mm. The distance between adjacent passages may for example be between 1 mm to 5 mm. It is also conceivable that the fine openings are created by perforation of a printed permeable volume, e.g. using laser drilling, high pressure jet drilling, or the like.

For example, using a rapid prototyping technique fine passages are made in the permeable volume that taper, so become narrower from an inlet side thereof to the fine opening in the surface of the mould cavity, e.g. over the entire length of the passage or over a portion thereof. This production is preferably done without requiring a further machining step to form these passages for the ejection fluid.

It is conceivable that the mould member has a single permeable volume. For example, the mould member is a mould drum having an outer tube of a permeable structure, e.g. of porous material, e.g. of sintered metal with a porous structure. Optionally, a tubular inner member is provided inside the permeable mould tube.

Alternatively, the mould member comprises multiple permeable volumes. From the prior art, techniques are known to position or integrate such a permeable volume into the mould member. For example, multiple permeable volumes are provided as inserts on a support member, e.g. on a solid, non-permeable, metal support member, e.g. by any known fastening technique, possibly in a releasable manner. This is e.g. disclosed in WO2004002229.

In an embodiment a permeable volume comprises only a single mould cavity, or two, or three mould cavities.

The outer surface of the permeable volume is advantageously 80-100% fluid tight, to prevent (ejection) fluid to escape via the outer circumferential surface instead of via the mould cavities. Possibly also other surfaces of the permeable volume are made fluid tight, such as end faces, e.g. head ends, to prevent fluid to escape via the head ends instead of via the mould cavities.

In embodiments, the mould member surface is made essentially fluid tight upon production of the permeable volume. It is also conceivable that the outer surface was made porous, followed by a sealing step to make the curved outer surface fluid tight. For example, a burnish treatment using one or more rollers is applied, creating a sealed layer, e.g. of approximately 1 mm. Other mechanical deformation techniques used to provide the fluid-tight barrier include mechanical polishing, grinding or media blasting. Yet alternatively, a fluid-tight barrier is provided at the outer surface with a different technique, such as impregnation with a resin or coating. With 3D printing techniques it is also possible to make part of the body porous, and another part, such as the outer surface, solid and fluid-tight.

In embodiments, a support member is provided adjacent the one or more permeable volumes, e.g. tubular inner member is provided inside a mould tube comprising one or more permeable volumes. The support member has an outer surface provided adjacent an inner surface of the permeable volume.

In embodiments, the support member is non-permeable and multiple fluid channels are defined between the support member and the one or more permeable volumes, such that each of the multiple fluid channels is below a group of mould cavities. In other words, the fluid channel is provided at the backside of the permeable volume of which the opposite side forms (part of) the mould cavity. For example, the fluid channels extend in the longitudinal direction below rows of cavities.

The channels are e.g. delimited by (part of) the non-permeable support member. In alternative embodiments, seals are provided between the channels.

In embodiments, both known and according to inventions disclosed herein, groups of mould cavities are arranged in the outer surface in a mould cavities pattern. E.g. when the mould member is a mould drum or a mould plate, the groups of mould cavities are arranged as lanes or rows of cavities. Herein, in a lane, cavities are arranged at multiple longitudinal positions when seen in longitudinal direction of the mould drum. A lane may be straight, so parallel to a mould drum axis, or helical as is known in the art.

In embodiments, both known and according to inventions disclosed herein, multiple lanes are provided on a mould drum when seen in circumferential direction. In embodiments, the drum surface may comprise 4, 5, 6, 7, 8, 9, 10, 11, 12 or more lanes of cavities, predominantly depending on the size of the products. In a lane multiple cavities are arranged, e.g. 2, 3, 4, 5, 6, 7, 8 or even more. Obviously, the length of the drum and the size of the cavities impacts the number of cavities in a lane. The length of the rotary mould drum in longitudinal direction is in practical embodiments between 30 and 120 centimetres, e.g. 60, 70, or 100 centimetres.

The system for moulding food products from a pumpable foodstuff mass preferably further comprises one or more of the following:
  a frame for supporting the mould member;
  a mould member drive system which, in operation, drives the mould member in a direction of movement at a mould member speed;
  a mass feed member which, in operation, is arranged at a fill position relative to the outer surface of the mould member, said mass feed member being adapted to transfer foodstuff mass into passing mould cavities of the mould member, said mass forming a food product in said mould cavity.

For example, the mould member is a rotary mould member, e.g. a rotary mould drum or a turret, having a longitudinal rotation axis. Preferably, the rotary mould member is rotatably supported by a frame about the longitudinal rotation axis, which is advantageously horizontal for a mould drum and vertical for a turret. Advantageously a mould member drive system is provided, which, in operation, rotates the mould member so as to revolve about the rotation axis in a direction of rotation. The rotation speed is e.g. 25-75 meters/minute.

A mass feed member is e.g. described in WO2004002229 of the same applicant.

The mass feed member feeds a pumpable foodstuff mass to the mould member having mould cavities, thereby creating portioned moulded food products.

In embodiments, the system is furthermore provided with
a mould member drive system which, in operation, moves the mould member in a direction of movement at a mould member speed;
an ejection fluid source drive system, which, in operation, moves the outlet opening in a counter-direction of movement at a fluid source speed,
wherein the mould member speed and/or the fluid source speed is adjustable during operation, allowing to increase the size of the overlapping area between the ejection fluid inlet opening and the outlet opening faster than with a constant speed of relative movement.

The mould member, both known and according to the inventions, is a rotary mould member, e.g. a rotary mould drum or a turret, which is rotatably supported by a frame about a longitudinal rotation axis, and wherein a mould member drive system, in operation, rotates the mould member so as to revolve about the rotation axis in a direction of rotation.

A rotary mould member is preferably rotatably supported by a frame to revolve about a rotation axis in a direction of rotation, which is commonly in horizontal orientation. This configuration is that of the known RevoPortioner.

In alternative embodiments, the mould member is embodied as a disc or turret, comprising a circle of multiple cavities, which disc or turret is rotatably supported on a frame to revolve about a turret rotation axis in a direction of rotation, which is commonly in a vertical orientation.

The present invention also relates to a method for moulding food products from a pumpable foodstuff mass, wherein use is made of a system for moulding food products from a pumpable foodstuff mass as described above, and according to the claims.

The invention also relates to a method for configuring a mould member for use in a system for moulding food products from a pumpable foodstuff mass as described above, and according to the claims. The method comprises the steps of:
providing a mould member comprising an outer surface wherein one or more recessed mould cavities are provided,
providing the mould member with an ejection fluid inlet opening and associated channel extending to a group of one or more mould cavities from which moulded food products are to be ejected simultaneously,
providing an ejection fluid source with an outlet opening,
arranging the ejection fluid inlet opening of the mould member relatively movable with respect to the outlet opening,
wherein ejection fluid is allowed to enter the mould member when an outlet opening overlaps an ejection fluid inlet opening,
wherein
the geometry of the ejection fluid inlet opening and/or the outlet opening of the ejection fluid source is provided such that, in use and at a given speed of relative movement, a size of an overlapping area between the ejection fluid inlet opening and the outlet opening from the initiation of the overlap increases faster than when both the inlet opening and the outlet opening have a circular cross section.

Preferably, the geometry of an opening is provided by providing an insert into the opening.

The present invention also relates to a mould member for use in a system for moulding food products from a pumpable foodstuff mass according to one of more of the claims, the mould member comprising an outer surface wherein one or more recessed mould cavities are provided, and further an ejection fluid inlet opening and associated channel extending to a group of one or more mould cavities from which moulded food products are to be ejected simultaneously, wherein the geometry of the ejection fluid inlet opening is such that, in use and at a given speed of relative movement, a size of the overlapping area between the ejection fluid inlet opening and an outlet opening of an ejection fluid source from the initiation of the overlap increases faster than when both openings have a circular cross section.

The present invention also relates to a mould member for use in a system for moulding food products from a pumpable foodstuff mass, the mould member comprising an outer surface wherein one or more recessed mould cavities are provided, and further an ejection fluid inlet opening and associated channel extending to a group of one or more mould cavities from which moulded food products are to be ejected simultaneously, wherein the geometry of the ejection fluid inlet opening comprise an elongated leading portion, extending perpendicular to a direction of the relative movement, wherein preferably the elongated leading portion is straight, or wherein the elongated leading portion is polygonal or curved, circumscribed by a circle having a radius significantly exceeding the diameter of the opening.

The present invention also relates to an ejection fluid source for use in a system for moulding food products from a pumpable foodstuff mass according to one or more of the claims, comprising an outlet opening arranged to allow ejection fluid to enter a mould member when the outlet opening overlaps an ejection fluid inlet opening of the mould member,
wherein the geometry of the outlet opening of the ejection fluid source is such that, in use and at a given speed of relative movement of the ejection fluid source and the mould member, a size of the overlapping area between the ejection fluid inlet opening and the outlet opening from the initiation of the overlap increases faster than when both openings have a circular cross section.

The present invention also relates to an ejection fluid source for use in a system for moulding food products from a pumpable foodstuff mass, comprising an outlet opening arranged to allow ejection fluid to enter a mould member when the outlet opening overlaps an ejection fluid inlet opening of the mould member,
wherein the geometry of the outlet opening of the ejection fluid source comprises an elongated leading portion, extending perpendicular to a direction of the relative movement, wherein preferably the elongated leading portion is straight, or wherein the elongated leading portion is polygonal or curved, circumscribed by a circle having a radius significantly exceeding the diameter of the opening.

The invention further relates to a system for moulding food products from a pumpable foodstuff mass, which system comprises:

a mould member comprising an outer surface wherein one or more recessed mould cavities are provided, and further an ejection fluid inlet opening and associated channel extending to a group of one or more mould cavities from which moulded food products are to be ejected simultaneously, an ejection fluid source comprising an outlet opening, in which system an ejection fluid inlet opening of the mould member is arranged relatively movable with respect to the outlet opening of the ejection fluid source so as to allow ejection fluid to enter the mould member when an outlet opening overlaps an ejection fluid inlet opening, wherein the geometry of the ejection fluid inlet opening and/or the outlet opening of the ejection fluid source is such that, in use and at a given speed of relative movement, a size of the overlapping area between the ejection fluid inlet opening and the outlet opening from the initiation of the overlap increases faster than when both the inlet opening and the outlet opening have a circular cross section.

The invention further relates to a system for moulding food products from a pumpable foodstuff mass, which system comprises:

a mould member comprising an outer surface wherein one or more recessed mould cavities are provided, and further an ejection fluid inlet opening and associated channel extending to a group of one or more mould cavities from which moulded food products are to be ejected simultaneously, an ejection fluid source comprising an outlet opening, in which system an ejection fluid inlet opening of the mould member is arranged relatively movable with respect to the outlet opening of the ejection fluid source so as to allow ejection fluid to enter the mould member when an outlet opening overlaps an ejection fluid inlet opening, wherein the ejection fluid inlet opening and/or the outlet opening comprise an elongated leading portion, extending perpendicular to a direction of the relative movement.

The invention further relates to a system for moulding food products from a pumpable foodstuff mass, which system comprises:

a mould member comprising an outer surface wherein one or more recessed mould cavities are provided, and further an ejection fluid inlet opening and associated channel extending to a group of one or more mould cavities from which moulded food products are to be ejected simultaneously, an ejection fluid source comprising an outlet opening, in which system an ejection fluid inlet opening of the mould member is arranged relatively movable with respect to the outlet opening of the ejection fluid source so as to allow ejection fluid to enter the mould member when an outlet opening overlaps an ejection fluid inlet opening, wherein one of the inlet openings or the outlet openings does not have a circular cross section.

The invention further relates to a system for moulding food products from a pumpable foodstuff mass, which system comprises:

a mould member comprising a permeable volume defining an outer surface wherein one or more recessed mould cavities are provided, and further an ejection fluid inlet opening and associated channel extending to the one or more permeable volumes of the one or more mould cavities from which moulded food products are to be ejected simultaneously, an ejection fluid source (30) comprising an outlet opening (31), in which system an ejection fluid inlet opening (23) of the mould member is arranged relatively movable with respect to the outlet opening of the ejection fluid source so as to allow ejection fluid to enter the mould member when an outlet opening overlaps an ejection fluid inlet opening, characterized in that the geometry of the ejection fluid inlet opening and/or the outlet opening of the ejection fluid source is such that, in use and at a given speed of relative movement, the size of the overlapping area between the ejection fluid inlet opening and the outlet opening from the initiation of the overlap increases faster than when both openings have a circular cross section.

According to a second aspect of the invention, the aim of the invention is alternatively achieved by a system for moulding food products from a pumpable foodstuff mass, which system comprises:

a mould member comprising an outer surface wherein one or more recessed mould cavities are provided, and further an ejection fluid inlet opening and associated channel extending to a group of one or more mould cavities from which moulded food products are to be ejected simultaneously, an ejection fluid source comprising an outlet opening;

a mould member drive system which, in operation, moves the mould member in a direction of movement at a mould member speed;

in which system an ejection fluid inlet opening (23) of the mould member is arranged relatively movable with respect to the outlet opening of the ejection fluid source so as to allow ejection fluid to enter the mould member when an outlet opening overlaps an ejection fluid inlet opening, characterized in that the system further comprises:

an outlet opening drive system, which, in operation, moves the outlet opening of the ejection fluid source in a counter-direction of movement at a fluid source speed, wherein the mould member speed and/or the fluid source speed is adjustable during operation, allowing to increase a size of overlapping area between the ejection fluid inlet opening and the outlet opening faster than with a constant speed of relative movement.

With such a combination of mould member drive system and ejection fluid source drive system, the size of the overlapping area between an ejection fluid inlet opening and an outlet opening can be allowed to increase even faster than with only the adjusted geometries. This attributes to efficient air use.

Advantageously, the mould member speed is constant during operation, and the fluid source speed is adjustable. For example, the fluid source is allowed a small movement just prior to (or starting from, or just after) the initiation of the overlap of the openings.

In embodiments of the system according to the second aspect of the invention, the geometry of the ejection fluid inlet opening and/or the outlet opening of the ejection fluid source is such that, in use and at a given speed of relative movement, a size of the overlapping area between the ejection fluid inlet opening and the outlet opening from the initiation of the overlap increases faster than when both the inlet opening and the outlet opening have a circular cross section. An advantage of this improved geometry is that with an increased growth of overlapping area the building up of pressure occurs faster, i.e. a faster compression speed, resulting in a stronger fluid pulse and more effective ejection of moulded products. As such, optimum use is made of the ejection fluid, while minimizing the use to a required extent.

In embodiments of the system according to the second aspect of the invention, the mould member comprises a permeable volume defining an outer surface wherein one or more recessed mould cavities are provided, and one or more channels extending to the one or more permeable volumes of the group of one or more mould cavities from which moulded food products are to be ejected simultaneously.

In embodiments of the system according to the second aspect of the invention, the system further comprising one or more of the following:
 a frame for supporting the mould member;
 a mould member drive system which, in operation, drives the mould member in a direction of movement at a mould member speed;
 a mass feed member which, in operation, is arranged at a fill position relative to the outer surface of the mould member, said mass feed member being adapted to transfer pumpable foodstuff mass into passing mould cavities, said mass forming a food product in said mould cavity.

It is envisaged that the aspects of the invention can be applied in combination, and that preferred features of one aspect of the invention can be applied in combination with the other aspect of the invention.

BRIEF DESCRIPTION OF THE DRAWINGS

The invention will further be explained in relation to the drawings, in which:

FIG. 1a represents a perspective view of a system according to the first aspect of the invention;

FIG. 1b represents a detail of the system of FIG. 1a;

FIG. 1c represents an alternative mould member of a system of FIG. 1a;

FIG. 1d represents an exploded view of the system of FIG. 1b

FIG. 1e represents an exploded view of the mould member of FIG. 1b;

FIG. 1f represents an exploded view of the mould member of FIG. 1c;

FIG. 10a represents a perspective top view of an alternative system according to the first aspect of the invention;

FIG. 10b represents a perspective bottom view of an alternative system according to the first aspect of the invention;

FIG. 11a and 11b show a perspective view of a system according to the second aspect of the invention

BRIEF DESCRIPTION OF VARIOUS EMBODIMENTS

Figure 2A:
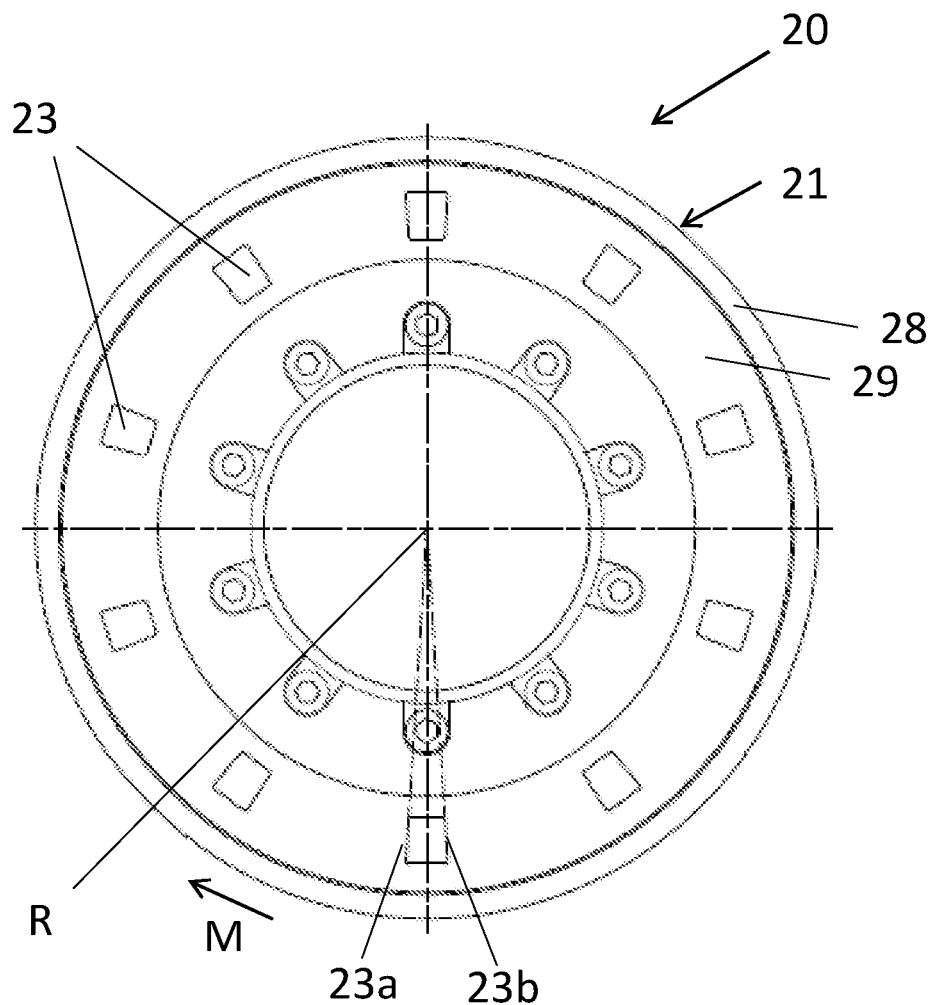
FIGS. 2a-2c represents part of a mould member and an ejection fluid source according to the first aspect of the invention.

In FIGS. 1a-2c a system 1 for moulding food products from a pumpable foodstuff mass according to the first aspect of the invention is shown. The system includes a mould member 20 and an ejection fluid source 30. The pumpable foodstuff mass is received in a hopper 11, from which the foodstuff mass is possibly further processed, e.g. grinded and/or mixed, and subsequently pumped via a hose 12 to a mass feed member 10. The mass feed member is preferably a mass feed member as known from WO2004/002229.

In FIG. 1a it is shown that the system 1 includes a frame 5, supporting an axle 6 for supporting the mould member 20, here configured as a mould drum. The mould drum 20 is rotatably supported onto the axle 6 about a drum rotation axis R. At one side of the mould drum 20, a mould drum drive system including a motor 8 is provided, which, in operation, rotates the axle and the mould drum 20 supported thereby in a rotation direction D at a mould member speed. A mass feed member 10 is provided, which, in operation, is arranged at a fill position relative to the outer surface of the mould member 20. The mass feed member is adapted to transfer pumpable foodstuff mass into passing mould cavities, said mass forming a food product in said mould cavity.

The system 1 further comprises an ejection fluid source 30 comprising an outlet opening 31. An ejection fluid inlet opening 23 (visible in FIG. 1b) of the mould member is arranged relatively movable with respect to the outlet opening 31, wherein ejection fluid is allowed to enter the mould member when an outlet opening overlaps an ejection fluid inlet opening. The ejection fluid source 30 provides ejection fluid to the fluid inlet openings 23, to cause ejection of the moulded products, wherein the ejected moulded products will drop onto a conveyor 15.

The mould member 20 is here a rotatable drum, rotatable about a drum rotation axis R in a movement direction M. The drum comprises an outer surface 21. In the outer surface 21, multiple parallel rows of recessed mould cavities 22 are provided, parallel to the drum rotation axis R. Here there are 10 rows of 15 cavities each. Here, the cavities have a circular shape and all having the same depth, suitable for making hamburger-shaped patties.

As visible in FIGS. 1e, 1f and 2a, the mould member 20 of the shown embodiment comprises a permeable volume 28 defining the outer surface 21 wherein the mould cavities 22 are provided. The permeable volume 28 is here embodied as an elongated, permeable tube. The outer circumferential surface is smooth to allow rotation past a mass feed member. Furthermore, the outer circumferential surface is fluid tight, not allowing the passage of fluid, so as to direct the fluid to the recessed mould cavities 22.

Also visible in FIGS. 1e, 1f and 2a, is that the mould member 20 further comprises a tubular inner member 29, provided inside the permeable tube 28. Tubular inner member 29 is non-permeable and multiple fluid channels 24 are defined between the tubular inner member 5 and the permeable mould tube 2, such that each of the multiple fluid channels 24 is below a group G of mould cavities. In the shown embodiment, the channels 24 are delimited by seals (not visible), e.g. rubber seals, separating the tubular inner member 29 from the permeable mould tube 28, here per row of mould cavities. Here the seals extend radially from the tubular inner member 29, and extend in axial direction, parallel to the drum rotation axis R.

From FIG. 1e and 1f follows that the mould member 20 of the shown embodiment comprises flange structures 25, 25', 26 at the head ends thereof. In FIG. 1b and 1e a first embodiment of a driven flange structure 25 is visible, and in FIG. 1c and 1f and alternative embodiment 25' is shown. At the opposite end a support flange structure 26 is provided. The driven flange structures 25, 25' are provided to allow the mould drum 20 to be driven by the mould drum drive system including motor 8. To this end, the driven flange structure 25 of the embodiment of FIG. 1b and 1e is provided with drive bushings 25d. The alternative driven flange structure 25' does not have drive bushings, but a collection of recesses 25r', adapted to be engaged by protrusions provided at a mould member drive member, so as to provide a form closure or form attachments allowing to transfer torque from the mould drum drive to the driven flange structure. The collection of recesses 25r' of the shown flange structure 25' has a flower-shape with five projections 25r', forming a regular pattern. This configuration is also referred to as a spider coupling. Such a driven flange structure 25' allows a jaw coupling for transmitting torque. A particular advantage is that the mould member drive may be provided with an elastomer insert, commonly referred to as a spider, which allows the transmission of torque while damping system vibrations and accommodating misalignment, protecting the driven flange structure from damage.

The mould member 20 comprises multiple ejection fluid inlet openings 23 and associated fluid channels 24, extending to a group G, here a row, of mould cavities from which moulded products are to be ejected simultaneously. Here, one ejection fluid inlet opening 23 and one channel 24 is associated with a group G of mould cavities. From FIG. 1e and 1f follows that the fluid inlet openings 23 are provided in a flange member 25, 25'. The channels 24 extend from these openings, through the flange to the tubular inner member 28 and then below the group G of mould cavities.

In the shown embodiment, the mould member 20 is provided with a total number of 10 fluid inlet openings 23, all provided in a head end 25 of the mould member. In particular in FIG. 2a the quadrilateral perimeter of the inlet openings is visible, i.e. a polygon geometry with four sides and four corners. The inlet openings 23 have an elongated leading portion 23a, extending perpendicular to a direction of relative movement M, and an elongated trailing portion 23b. In the shown embodiment, the elongated leading portion 23a and trailing portion 23b are of equal length. In the shown embodiment, the leading and trailing portions 23a, 23b extend radially from the drum rotation axis R. The other sides could be straight and parallel, forming an isosceles trapezoid. It is also conceivable that the other sides are not straight and parallel, but e.g. formed as portions of a circle.

The system further comprises an ejection fluid source 30. The ejection fluid source 30 comprises an ejection fluid storage 37, e.g. comprising $CO_2$ or $O_2$. If air is used as ejection fluid, an ejection fluid storage may be dispensed with. The shown ejection fluid source further comprises a compressor 32, able to compress the ejection fluid from the ejection fluid storage 37, or from the air. A channel 35 may be provided between the ejection fluid storage and the compressor. Here, from the compressor 35, compressed ejection fluid is fed via a channel 34 to a distributor 33, which distributor comprises an outlet opening 31.

Figure 2B:
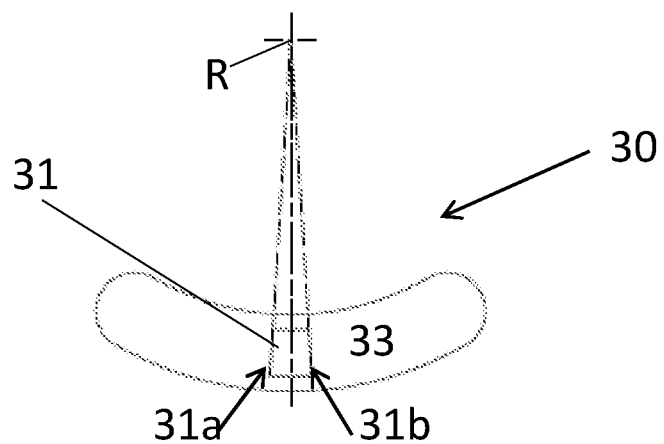
Figure 2C:
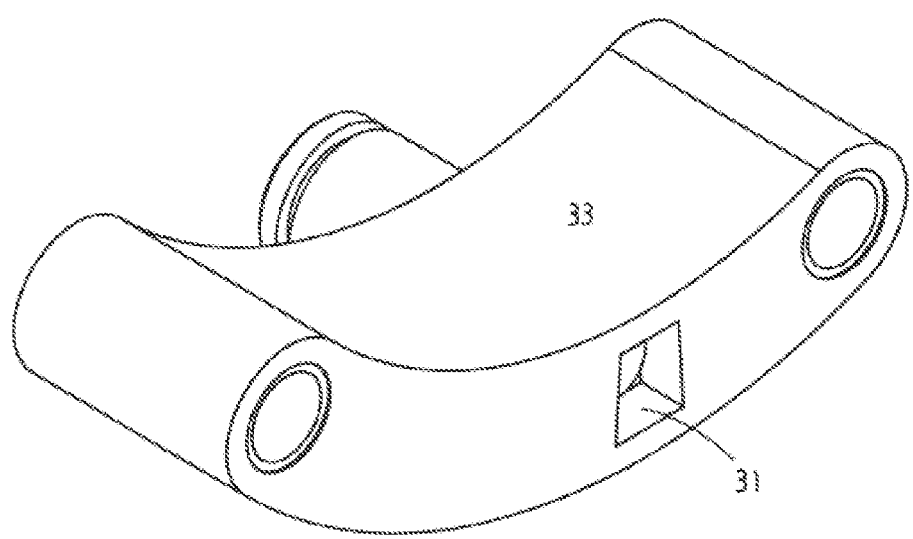

From FIGS. 1d, 2b and FIG. 2c follows that the distributor 33 with outlet opening 31 could be embodied as an exchangeable part, allowing the provision of alternative outlet openings for the ejection fluid source 30. For example, for different mould members associated outlet openings can be defined having an optimum increase of overlapping area.

As visible in FIG. 2b, the outlet opening 31 of the shown embodiment has a similar configuration as the fluid inlet opening of the mould 20. Outlet opening 31 has a quadrilateral perimeter, i.e. a polygon geometry with four sides and four corners. The outlet opening 31 has an elongated leading portion 31a, extending perpendicular to a direction of relative movement M, and an elongated trailing portion 31b. In the shown embodiment, the elongated leading portion 31a and trailing portion 31b are of equal length. In the shown embodiment, the leading and trailing portions 31a, 31b extend radially from the drum rotation axis R. The other sides could be straight and parallel, forming an isosceles trapezoid. It is also conceivable that the other sides are not straight and parallel, but e.g. formed as portions of a circle.

Figure 3B:
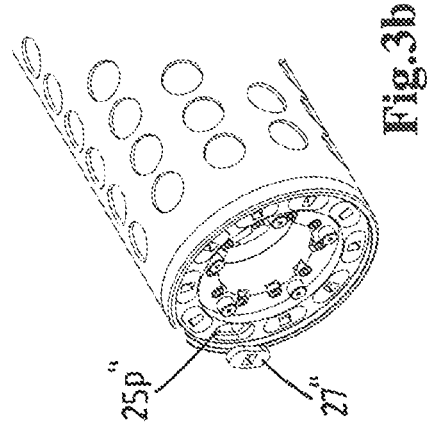
FIGS. 3a-3d represent details of possible embodiments of a mould member according to a first aspect of the invention.
Figure 3D:
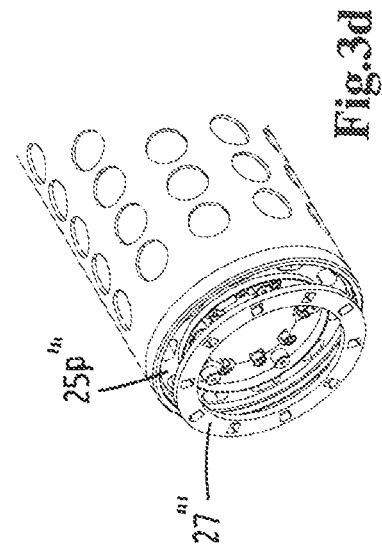
Figure 3A:
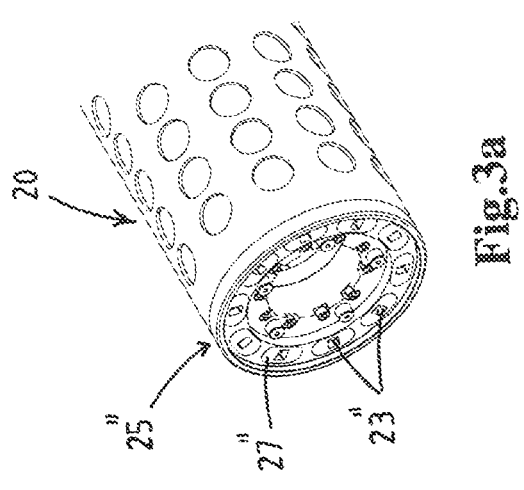

From FIGS. 3a-3d represent details of alternative driven flange structures 25", 25''' of a mould member 20 according to a first aspect of the invention. In FIG. 3a and 3b, driven flange structure 25" is shown, wherein the inlet openings 23" are provided in inserts 27", provided in openings 25p" in the driven flange structure 25" and forming a starting part of fluid channels 24 extending from the inlet openings 23" to the associated group of mould cavities. In FIG. 3a and 3b, an insert 27" for each fluid inlet opening 23" is provided.

Figure 3C:
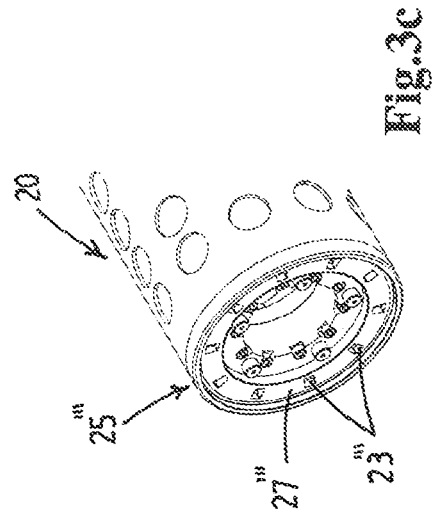

In FIG. 3c and 3d, driven flange structure 25''' is shown, wherein the inlet openings 23''' are provided in an insert 27''', provided in a recess 25p''' in the driven flange structure 25". The openings 23''' form a starting part of fluid channels 24 extending from the inlet openings 23''' to the associated group of mould cavities. In FIG. 3c and 3d, a ring-shaped insert 27''' comprising all fluid inlet opening 23''' is provided.

An ejection fluid inlet opening 23 of the mould member is arranged relatively movable with respect to the outlet opening 31. Preferably, the inlet openings 23 rotate with the mould drum 20, defining a circular movement path, and the outlet opening 31 is provided stationary. The outlet opening is provided adjacent the movement path of the inlet openings 23. This arrangement allows ejection fluid to enter the mould member 20 when an outlet opening 31 overlaps an ejection fluid inlet opening 23 (FIG. 1b and 1c).

According to the first aspect of the present invention, the geometry of the ejection fluid inlet opening 23 and the outlet opening 31 of the ejection fluid source 30 are such that, in use and at a given speed of relative movement, a size of the overlapping area between the ejection fluid inlet opening and the outlet opening from the initiation of the overlap increases faster than when both the inlet opening and the outlet opening have a circular cross section.

In FIGS. 1-3, both the ejection fluid inlet opening 23 and the outlet opening 31 have a square cross section. The linear contact between the square openings at the initiation of the overlap results in a sudden increase of growth of overlapping area, resulting in a fast build-up of pressure.

Figure 4:
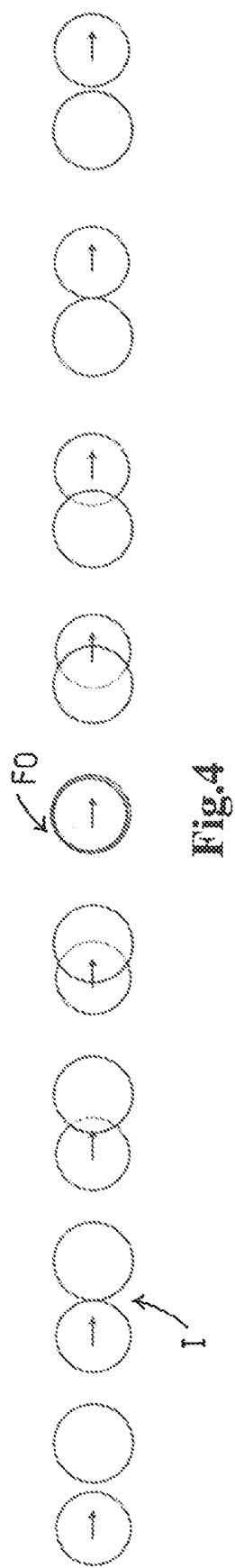
FIG. 4 schematically shows the process of overlapping circular cross sections of the openings.
Figure 6:
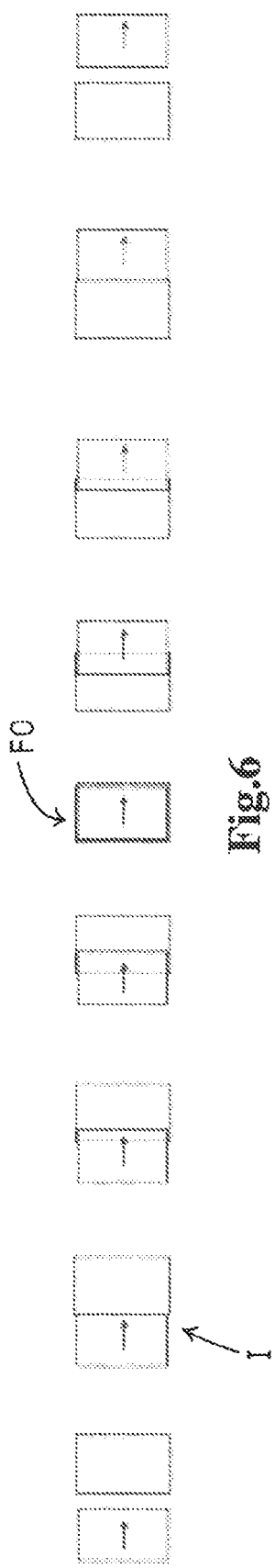
FIG. 6 schematically shows the process of overlapping rectangular cross sections of the openings.

In FIGS. 4 and 6, the process of overlapping openings is schematically represented. The process is shown from prior to the initiation of the overlap, the initiation of the overlap I, a position wherein the openings fully overlap FO, until a position wherein the overlap has ended.

It follows from FIG. 4 that it takes relatively a long travel distance before a large overlapping cross-sectional area of both circular openings is created. This results in a relatively slow, less steep, pressure rise (compression speed).

In FIG. 6 the openings have a rectangular cross section. A large overlapping cross-sectional area of both openings is created within a shorter distance.

Figure 7:
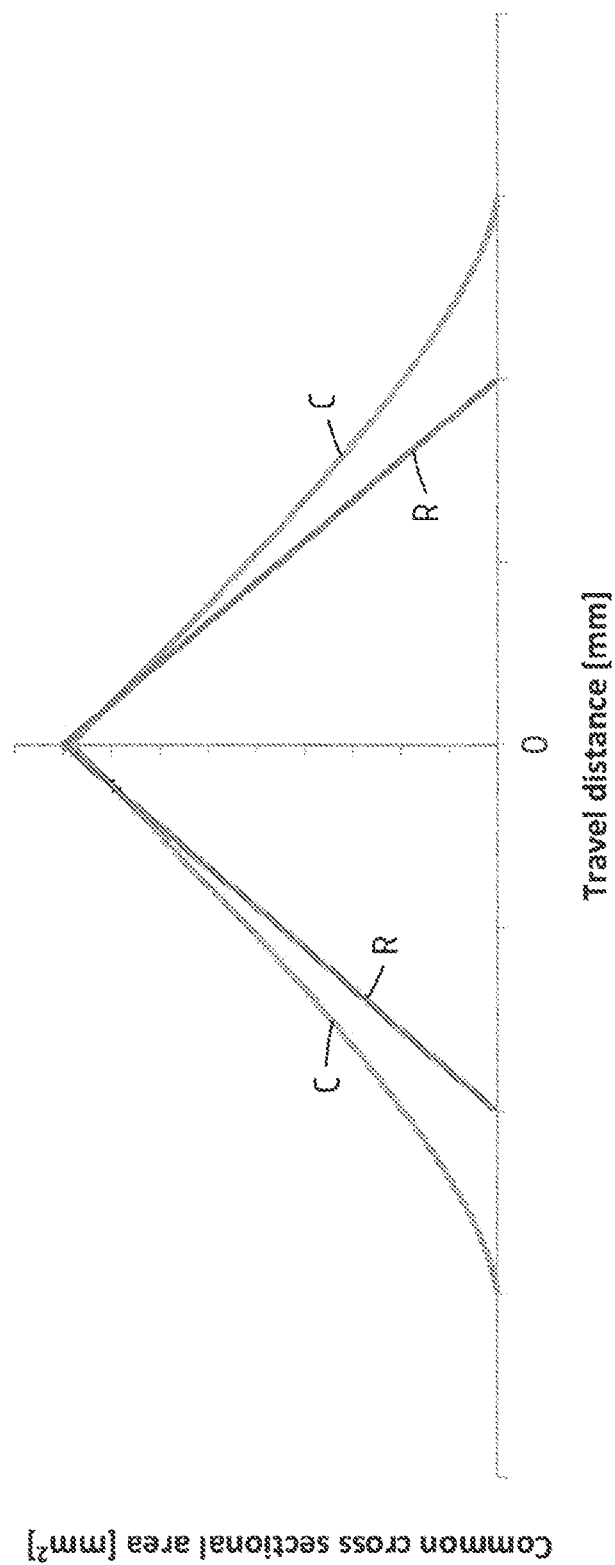
FIG. 7 shows a schematic diagram of the size of the overlapping area with circular and rectangular cross sections of the openings.

In the diagram of FIG. 7 the difference is shown, in that the common cross-sectional area is shown as a function of the travel distance between the openings, wherein '0' corresponds to overlap of or crossing of center lines of the openings. In embodiments, this corresponds to a full overlap of the openings. In the shown graph, there is only a momentary overlap: the common cross-sectional area increases until the overlap and immediately thereafter decreases. Embodiments are conceivable wherein there is a longer travel distance wherein the overlap is at a maximum, e.g. wherein one of the openings is circular, and the other a curved and oblong shaped opening with two semi-circular ends connected by an inner and outer radius. In this case the mountain-shape will not have a sharp peak but have the shape of a table mountain.

Indicated are the situation for circular inlet and outlet openings, indicated with a 'C', corresponding to FIG. 4, and rectangular inlet and outlet openings, indicated with an 'R', corresponding to FIG. 6. With the same common cross-sectional area at the full overlap, it follows that the increase in size of the overlapping area between the ejection fluid inlet opening and the outlet opening is faster for the rectangular cross sections than for the circular cross sections. This illustrates the inventive system, wherein an ejection fluid inlet opening of the mould member is arranged relatively movable at a relative speed of rotation with respect to the outlet opening of the ejection fluid source. At the left-hand side of the diagram of FIG. 7, the fluid inlet opening travels relative to the fluid outlet opening in use of the system, thereby initiating an overlap between the ejection fluid inlet opening and the outlet opening. This overlap has an area which—in a period following the initiation—gradually increases in size to a full overlap, and which overlap allows ejection fluid emitted from the fluid outlet opening to enter the fluid inlet opening of the mould member.

The line indicated with an "R", representing rectangular inlet and outlet openings, represents a pattern of a geometry of the ejection fluid inlet opening and the outlet opening of the ejection fluid source wherein the inclination at the start is steep and remains essentially constant during movement, until maximum overlap. This steepness results in a 'boost' of pressure attributing to the removal of products.

The line indicated with a "C" is shown as a reference system wherein both the ejection fluid inlet opening and the outlet opening of the ejection fluid source have a circular cross section and having the same full overlap. The line is given as a comparison, indicating that in the period following the initiation of overlap to the establishment of the full overlap, the size of the overlap area initially increases slow. The line "R" clearly increases faster than in the reference system indicated with line "C". This effect is achieved by the inventive geometry.

In the system of the invention, a faster increase in size of the overlapping area results in a fast entry of ejection fluid into the mould member, corresponding to a faster compression and more effective ejection of the moulded products.

Figure 5:
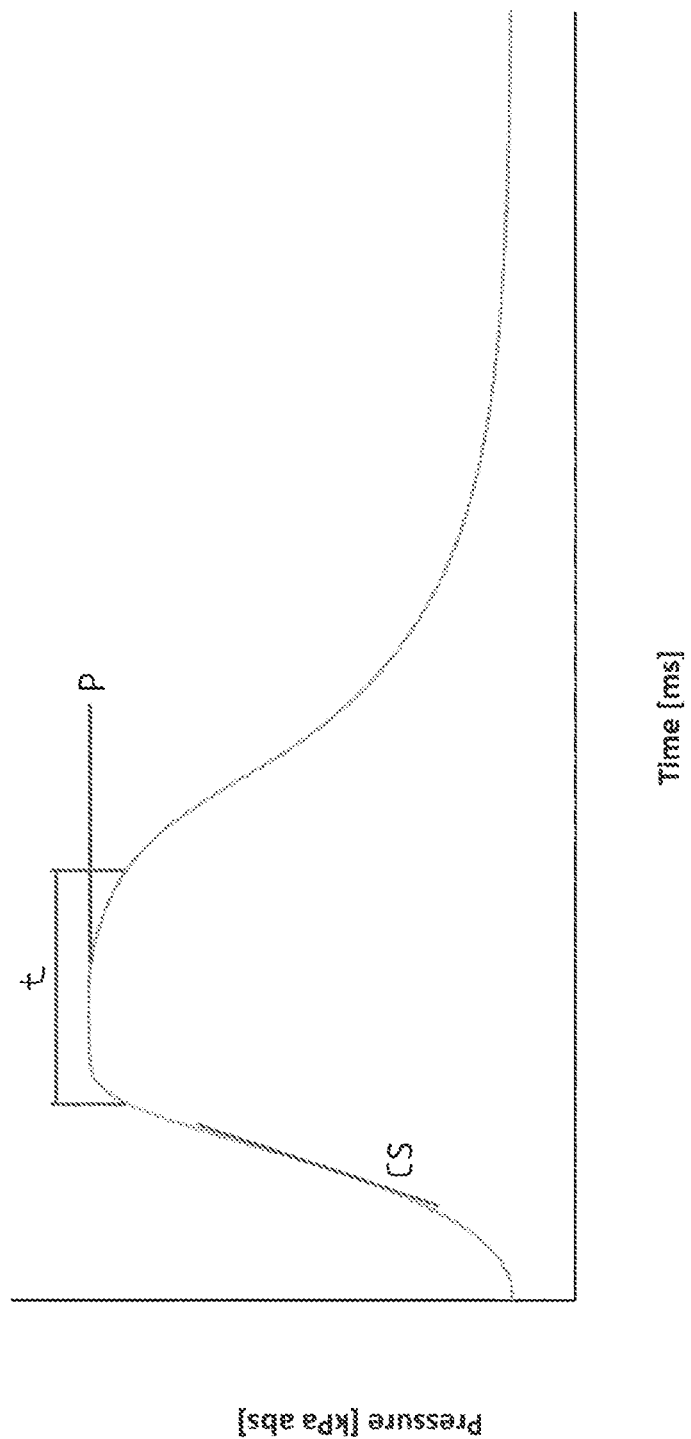
FIG. 5 shows a schematic diagram of the building up of pressure in a mould member.

In the diagram of FIG. 5 the building up of pressure in the mould member is schematically represented. After the initiation of the overlap of the inlet opening and the outlet opening, the building up of pressure in the channel associated with the inlet opening starts. The speed with which this occurs, i.e. the slope in the diagram, is referred to as the compression speed cs. The pressure in the mould member will increase to a peak value P. Prior to the ejection of the moulded products, the mould member is a time t at an elevated pressure. According to the first aspect of the invention, the speed with which the size of the overlap increases, and thus the compression speed cs. The ejection of food products is also affected by the maximum pressure P of the ejection fluid that is reached during the overlap, which is influenced by the pressure of the ejection fluid source and the size of the overlap. The ejection of food products is also affected by the duration of the ejection fluid flow, i.e. the time of overlap and thus the time during which a certain ejection fluid pressure is supplied to the mould cavities.

FIGS. 8a-8d and FIGS. 9a-9e show exemplary geometries of the ejection fluid inlet opening and the outlet opening according to the first aspect of the present invention. For the first aspect of the invention, it does not matter which opening is the ejection fluid inlet opening, and which opening is the ejection fluid opening. Directions of relative movement are indicated with arrows. For the first aspect of the invention, it is not necessary that both openings move: if one opening moves in the indicated direction, this will result in a relative movement according to the first aspect of the invention.

Figure 8A:
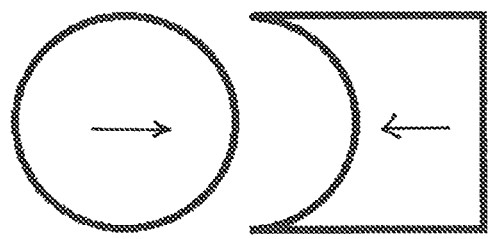
FIGS. 8a-8d show exemplary geometries of the ejection fluid inlet opening and the outlet opening according to the first aspect of the present invention.
Figure 8B:
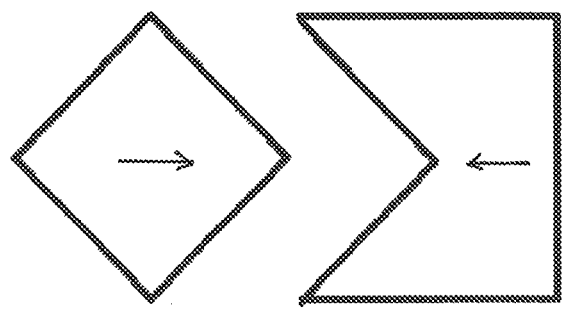
Figure 8C:
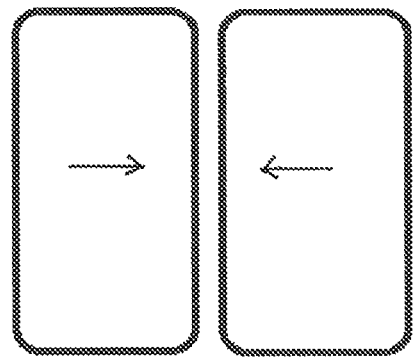
Figure 8D:
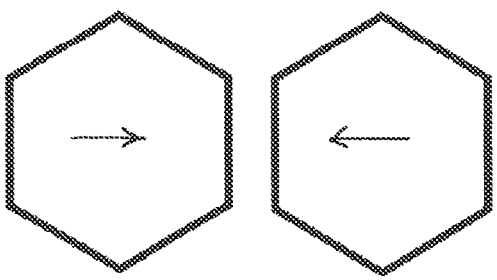
Figure 9A:
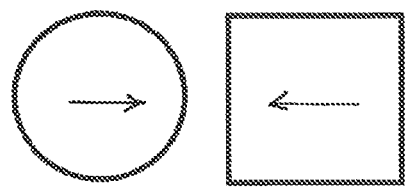
FIGS. 9a-9e show alternative exemplary geometries of the ejection fluid inlet opening and the outlet opening, not according to the first aspect of the present invention.
Figure 9B:
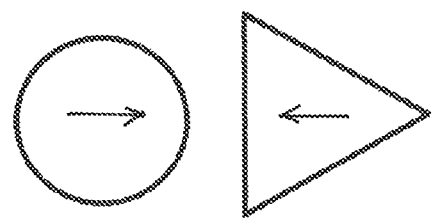
Figure 9C:
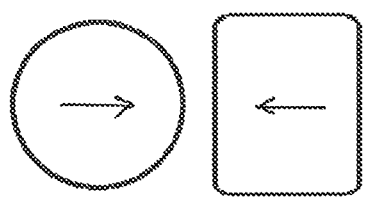
Figure 9D:
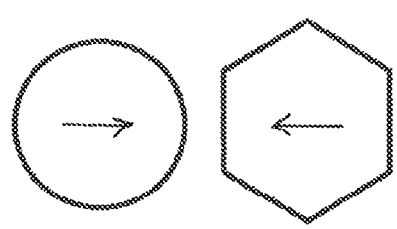
Figure 9E:
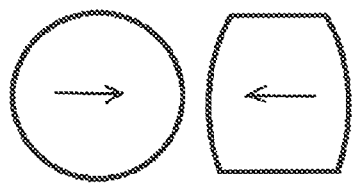

In FIGS. 8a-8d, examples are presented wherein at the initiation of the overlap there is a linear contact between the ejection fluid inlet opening and the outlet opening. In particular, in FIG. 8a, one opening has a circular cross section, and the other opening has, at one end thereof, a complementary concave shape. In FIG. 8b, one opening has a diamond shape opening, and the other opening has, at one end thereof, a complementary triangular shape. In FIG. 8c, both openings have an oblong shape. In FIG. 8d, both openings have a hexagonal shape, oriented such that an elongated side thereof forms a linear contact at the initiation of the overlap.

In FIGS. 9a-9e, examples are presented wherein one of the ejection fluid inlet opening and the outlet opening comprises an elongated leading portion, extending perpendicular to the direction of relative movement. The other opening still has a circular cross section, and hence at the initiation of the overlap there will be a point contact. The elongated leading portions will attribute to a fast increase of size of overlapping area from the initiation of the overlap. It is noted that when both openings have an elongated leading portion the increase in size of the overlapping area may even be faster. In particular, in FIGS. 9a-9e one of the openings has respectively a square cross section, a triangular cross section, an oblong cross section, a hexagonal shape and a truncated oval, all having an elongated side extending perpendicular to the direction of relative movement.

FIG. 10a and 10b represent perspective views of an alternative system 100 according to the first aspect of the invention. System 100 for moulding food products from a pumpable foodstuff mass comprises a mould member 120 embodied as a so-called turret. The turret has a disc-shape and is rotatable about a vertical rotation axis 110. Turret 120 comprises an outer bottom surface 121 wherein one or more, here 6, recessed mould cavities 122 are provided. Food mass is fed to a cavity 122 at a fill position of the cavity 122, after which the turret 120 is allowed to rotate to an ejection position of the cavity 122 where the food product is ejected from the cavity 122.

At an opposite upper surface 125 of the turret, ejection fluid inlet openings 123 are provided. Associated channels (not visible) extend between the inlet opening and a mould cavity 122 from which a moulded food product is to be ejected. Here, each ejection fluid inlet opening 123 is thus associated with a single mould cavity 122.

An ejection fluid source 130 comprising an outlet opening 131 is arranged relatively movable with respect to the ejection fluid inlet opening 123 of the mould member. The ejection fluid source 130 is of a similar design as ejection fluid source 30 as shown in FIGS. 1*a*-1*f*. From FIG. 10*b* follows that the distributor 133 could be provided as an exchangeable part. In the shown configuration, the mould member 120 is movable with respect to the stationary ejection fluid source 130. Ejection fluid is allowed to enter the mould member 120 when outlet opening 131 overlaps an ejection fluid inlet opening 123. According to the first aspect of the invention, in the shown configuration the geometry of the ejection fluid inlet opening 123 and the outlet opening 131 of the ejection fluid source 130 is essentially rectangular such that, at a given speed of movement of the turret 120, a size of the overlapping area between the ejection fluid inlet opening and the outlet opening from the initiation of the overlap increases faster than when both the inlet opening and the outlet opening have a circular cross section.

FIG. 11*a* and 11*b* show a perspective view of a system 200 according to the second aspect of the invention. The system 200 for moulding food products from a pumpable foodstuff mass comprises a mould member 220 similar to mould member 20 of FIGS. 1*a*-1*f*, comprising an outer surface 221 wherein one or more recessed mould cavities 222 are provided. The mould member 220, here embodied as a mould drum, is further provided with ejection fluid inlet openings 223 and associated channels (not visible) extending to a group G of one or more mould cavities from which moulded food products are to be ejected simultaneously. Here, the ejection fluid inlet openings have a circular shape.

The mould drum 220 is rotatable about a horizontal axis 220 R in a rotation direction A. A drive system (not shown) is provided which, in operation, moves the mould member in a direction of movement at a mould member speed.

In operation, a food mass is fed to the passing mould cavities by a mass feed member arranged at a fill position relative to the outer surface of the mould member 220, e.g. above the mould member 220.

The system 200 further comprises an ejection fluid source 230 comprising an outlet opening 231 which is arranged relatively movable with respect to the ejection fluid inlet openings 223 of the mould member, wherein ejection fluid is allowed to enter the mould member when an outlet opening overlaps an ejection fluid inlet opening. The ejection fluid source 230 comprises a distributor 233 in which the outlet opening 231 is arranged. The outlet opening here has a circular shape.

According to a second aspect of the invention, the system 200 further comprises an outlet opening drive system 235, which, in operation, moves the outlet opening 231 of the ejection fluid source in a counter-direction of movement, contrary to the direction of movement A, at a fluid source speed. The mould member speed and/or the fluid source speed is adjustable during operation, allowing to increase a size of overlapping area between the ejection fluid inlet opening and the outlet opening faster than with a constant speed of relative movement.

The shown configuration allows a reciprocating movement of the outlet opening 231, of which the timing can be tuned such that a size of overlapping area between the ejection fluid inlet opening 223 and the outlet opening 231 increases faster than when only the mould drum with the inlet opening 223 rotates.

The invention claimed is:

1. A system for moulding food products from a pumpable foodstuff mass, which system comprises:
    a mould member comprising an outer surface wherein one or more recessed mould cavities are provided, and further an ejection fluid inlet opening and associated channel extending to a group of one or more mould cavities from which moulded food products are to be ejected simultaneously,
    an ejection fluid source comprising an outlet opening,
    in which system an ejection fluid inlet opening of the mould member is arranged relatively movable with respect to the outlet opening of the ejection fluid source so as to allow ejection fluid to enter the mould member when an outlet opening overlaps an ejection fluid inlet opening,
    wherein the geometry of the ejection fluid inlet opening and the outlet opening of the ejection fluid source is such that at the initiation of the overlap there is a linear contact between the ejection fluid inlet opening and the outlet opening.

2. The system for moulding according to claim 1, wherein the ejection fluid inlet opening and/or the outlet opening comprise an elongated leading portion, extending perpendicular to a direction of the relative movement.

3. The system for moulding according to claim 1, wherein the ejection fluid inlet opening and/or the outlet opening has a quadrilateral perimeter, having an elongated leading portion and a trailing portion of equal length, in particular an isosceles trapezoid perimeter.

4. The system for moulding according to claim 3, wherein the elongated leading portion is straight, or wherein the elongated leading portion is polygonal or curved, circumscribed by a circle having a radius significantly exceeding the diameter of the opening.

5. The system for moulding according to claim 1, wherein the geometry of the outlet opening of the ejection fluid source and/or the inlet opening of the mould member is adjustable, in particular the size and/or the shape of the opening.

6. The system for moulding according to claim 1, wherein the mould member comprises a permeable volume defining the outer surface wherein the mould cavities are provided, and the one or more channels extend to the one or more permeable volumes of the group of one or more mould cavities from which moulded food products are to be ejected simultaneously.

7. The system for moulding according to claim 1, further comprising one or more of the following:
    a frame for supporting the mould member;
    a mould member drive system which, in operation, drives the mould member in a direction of movement at a mould member speed;
    a mass feed member which, in operation, is arranged at a fill position relative to the outer surface of the mould member, said mass feed member being adapted to transfer pumpable foodstuff mass into passing mould cavities, said mass forming a food product in said mould cavity.

8. The system for moulding according to claim 1, further comprising:
    a mould member drive system which, in operation, moves the mould member in a direction of movement at a mould member speed;

an outlet opening drive system, which, in operation, moves the outlet opening of the ejection fluid source in a counter-direction of movement at a fluid source speed, wherein the mould member speed and/or the fluid source speed is adjustable during operation, allowing to increase a size of overlapping area between the ejection fluid inlet opening and the outlet opening faster than with a constant speed of relative movement.

9. The system for moulding according to claim 1, wherein a channel has a cross-sectional area exceeding the surface area of an associated ejection fluid inlet opening.

10. The system for moulding according to claim 1, wherein the mould member is a rotary mould member, e.g. a rotary mould drum or a turret, which is rotatably supported by a frame about a longitudinal rotation axis, and wherein a mould member drive system, in operation, rotates the mould member so as to revolve about the rotation axis in a direction of rotation.

11. A method for moulding food products from a pumpable foodstuff mass, wherein use is made of a system for moulding food products from a pumpable foodstuff mass according to claim 1.

12. The method for configuring a mould member for use in a system for moulding food products from a pumpable foodstuff mass according to claim 1, the method comprising the steps of:

providing a mould member comprising an outer surface wherein one or more recessed mould cavities are provided, providing the mould member with an ejection fluid inlet opening and associated channel extending to a group of one or more mould cavities from which moulded food products are to be ejected simultaneously, providing an ejection fluid source with an outlet opening, arranging an ejection fluid inlet opening of the mould member relatively movable with respect to the outlet opening of the ejection fluid source, wherein ejection fluid is allowed to enter the mould member when an outlet opening overlaps an ejection fluid inlet opening, wherein the geometry of the ejection fluid inlet opening and the outlet opening of the ejection fluid source is provided such that, in use and at a given speed of relative movement, at the initiation of the overlap there is a linear contact between the ejection fluid inlet opening and the outlet opening.

13. The method for configuring a mould member according to claim 12, wherein the geometry of the ejection fluid inlet opening and/or the outlet opening is provided by providing an insert into respectively the ejection fluid inlet opening and/or the outlet opening.

* * * * *